United States Patent [19]

Wambach

[11] 4,011,193
[45] Mar. 8, 1977

[54] REINFORCED THERMOPLASTIC POLYESTER COMPOSITIONS

[75] Inventor: Allen D. Wambach, Pittsfield, Mass.

[73] Assignee: General Electric Company, Pittsfield, Mass.

[22] Filed: Dec. 13, 1972

[21] Appl. No.: 314,544

[52] U.S. Cl. .............................. 260/40 R; 106/299
[51] Int. Cl.² ...................... C08K 3/22; C08K 7/08
[58] Field of Search ................... 106/299; 260/40 R

[56] References Cited

UNITED STATES PATENTS

| | | | |
|---|---|---|---|
| 3,129,105 | 4/1964 | Berry et al. | 106/299 X |
| 3,530,079 | 9/1970 | Iwasyk et al. | 106/299 X |
| 3,953,394 | 4/1976 | Fox et al. | 260/40 R |

FOREIGN PATENTS OR APPLICATIONS

| | | | |
|---|---|---|---|
| 879,151 | 8/1971 | Canada | 260/40 R |
| 1,010,043 | 11/1965 | United Kingdom | 260/40 R |

OTHER PUBLICATIONS

J. J. Shyne et al., "Whiskers" from *Modern Plastics Ency.*, 1967 vol. 44, No. 1A (Sept., 1966), pp. 611–612, 614.

*Primary Examiner*—Donald E. Czaja
*Assistant Examiner*—S. M. Person
*Attorney, Agent, or Firm*—William F. Mufatti; Edward A. Hedman; Rocco S. Barrese

[57] ABSTRACT

Reinforced thermoplastic compositions are provided comprising a high molecular weight linear polyester, and a minor proportion of potassium titanate, substantially in the form of single filament crystals. The use of the potassium titanate elevates strength, modulus and heat deflection temperature, while retaining the inherent toughness of the polyester resin component.

7 Claims, No Drawings

REINFORCED THERMOPLASTIC POLYESTER COMPOSITIONS

This invention relates to reinforced thermoplastic polyester compositions. More particularly, it pertains to compositions comprising a linear high molecular weight polyester and a reinforcement comprising potassium titanate substantially in the form of single crystal filaments. The reinforced compositions retain the toughness of the polyester component, while the strength, modulus and heat deflection temperature are increased.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber-formers.

With the development of molecular weight control, use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

A useful family of such compositions are those which are glass-reinforced, e.g., with from about 20 to about 40% of filamentous glass, based on the weight of glass and polyester component. Unfortunately, the addition of reinforcing fillers, including glass, mica, talc, and the like, even in very small amounts, always causes the compositions to become brittle, i.e., to lose the inherent toughness of the polyester component.

For example, addition of between 1 to 4 percent by weight of glass filaments, calcium silicate, talc and mica reduces the elongation at break and ductile (Gardner, falling dart) impact strength of unreinforced poly(1,4-butylene terephthalate), even though the strength, modulus and heat deflection temperatures are increased.

A unique reinforcement for high molecular weight linear polyesters, namely potassium titanate in the form of single crystal filaments, has now been discovered. At low levels of concentration of this reinforcement, the polyester resins are found to have elevated strengths, moduli and heat deflection temperatures, while retaining a surprising degree of practical toughness, as measured by elongation and Gardner ductile impact strength.

DESCRIPTION OF THE INVENTION

According to this invention there are provided reinforced thermoplastic compositions, with enhanced toughness, for molding, e.g., injection molding, compression, molding, transfer molding, and the like, comprising:

a. a high molecular weight linear polyester resin; and
b. potassium titanate, substantially in the form of single crystal filaments, in a minor proportion based on said composition, in an amount at least sufficient to reinforce the composition but in an amount not in excess of that which embrittles the composition.

When used herein, the expressions "toughness" and "practical toughness" refer to the ability to withstand brittle fracture. The unreinforced polyesters are particularly outstanding in their toughness, but as has been mentioned above, addition of conventional reinforcements, even in small amounts, leads to embrittlement. Two techniques are, in general, very useful for measuring the toughness of such compositions. The first is a measurement of the fractional increase in length of the material stressed in tension. The higher the increase in length before breaking, the greater the toughness by this method (ASTM D-638). A second test is the Gardner falling dart impact test. The Gardner tester is a metal tube, graduated in inches, inside of which a metal dart is free to move. The tube is held vertically over a supporting stage, the flat surface of which is perpendicular to the tube. A plastic specimen (usually a 2½ × 2 × ⅛ inch chip or a 4 inch diameter by ⅛ inch disc) is mounted on the stage. The impact energy of the metal dart is determined by the height (in inches) to which it is raised before release. Several specimens are used for test drops to determine the approximate energy needed to produce breaks (or small cracks) in the plastic. Data recording then begins. The first drop is made using a height corresponding to the approximate energy determined by the test drops. If the sample shows no evidence of cracking, the next drop is made at a 1 inch greater height; if the sample cracks, however, the next drop is made from a 1 inch lower height. A fresh specimen is used for each drop. The procedure is repeated for at least 20 specimens. The "50% Failure Value" (in inch-pounds) is calculated as follows:

$$50\% \ F.V. = \frac{(\sum_i h_i n_i)w}{\sum_i n_i} = \frac{(\sum_i h_i n_i)w}{N}$$

wherein $h_i$ is the $i$-th height in inches; $n_i$ is the number of specimens tested at the $i$-th height; N is the total number of specimens tested; and $w$ is the weight (lbs) of the metal dart. The higher the Gardner impact strength — the higher the practical toughness.

The higher molecular weight normally flammable linear polyesters used in the present compositions are polymeric glycol esters of terephthalic acid and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539 and elsewhere.

Although the glycol portion of the polyester can contain from 2 to 10 carbon atoms, it is preferred that it contain from 2 to 4 carbon atoms in the form of linear methylene chains.

Preferred polyesters will be of the family consisting of high molecular weight, polymeric glycol terephthalates or isophthalates having repeating units of the general formula:

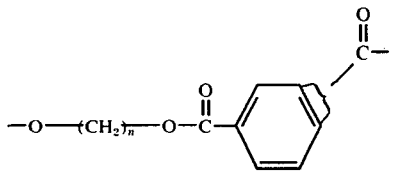

wherein n is a whole number of from 2 to 4, and mixtures of such esters, including copolyesters of terephthalic and isophthalic acids of up to about 30 mol.% isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.8 deciliters/gram and preferably at least about 1.1 deciliters/gram as measured in a 60:40 phenol-tetrachloroethane mixture at 30° C. At intrinsic viscosities of at least about 1.1 dl./g., there is a further enhancement in toughness of the present compositions.

The potassium titanate used as reinforcement must be substantially in the form of single crystal filaments. These are known to those skilled in the art also as "whiskers". The single crystal filaments will have a length greater than their diameter, i.e., their "aspect ratio" will be greater than 1 to 1. The preferred aspect ratio will be in the range of from about 10 to 1 to about 100 to 1. Especially preferably, the aspect ratio will be about 40 to 1. The single crystal filaments of potassium titanate can be made by means known to those skilled in the art, e.g., by vapor deposition or by reactions of salts in water under controlled temperature and pressure, such as 400°–700° C. and 3000 atmospheres. By way of illustration, blends of $TiO_2$, KCl and $K_2CO_3$ are kilned at 900° C. to yield $K_2Ti_4O_9$. This is melted, potassium is leached out of the melt, constitutional $H_2O$ is added, then removed from the crystal structure to form an octa-titanate, $K_2Ti_8O_{17}$, in whisker form. Typical whiskers are characterized in having a density of 3.2 gm./cm$^3$; tensile strength of $1 \times 10^6$ psi; and strength density of $9.2 \times 10^6$ inches. The diameter of typical whiskers range from 0.10 to 1.5 microns, preferably 0.10 to 0.16 microns. Potassium titanate whiskers useful in this invention are also commercially available, e.g., from the DuPont Company, Wilmington, Delaware, under the trademark FYBEX.

The potassium titanate single crystal filaments may be employed at a range of 1.0 to 10% by weight. However, a particularly preferred range is 1% to 5% by weight. Within this particularly preferred range it has been found advantageous to employ in certain compositions about 4.0% by weight. All percentages are based on the combined weights of polyester component (a) and potassium titanate component (b).

The compositions of this invention can be prepared by a number of procedures. In one way, the potassium titanate whiskers are put into an extrusion compounder with the polyester resin to produce molding pellets. The whiskers are dispersed in a matrix of the polyester resin in the process. In another procedure, the potassium titanate whiskers are mixed with the polyester resin by dry blending then either fluxed on a mill and comminuted or they are extruded and chopped. The potassium titanate whiskers can also be mixed with the powdered or granular polyester and directly molded, e.g., by injection or transfer molding techniques.

It is always very important to thoroughly free all of the ingredients; resin, reinforcement and any optional, conventional additives from as much water as possible.

In addition, compounding should be carried out to ensure that the residence time in the machine is short; the temperature is carefully controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after carefully pre-drying the polyester resin and the potassium titanate whiskers, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc. by standard techniques.

The compositions can be molded in any equipment conventionally used for glass-filled thermoplastic compositions. For example, with poly(1,4-butylene terephthalate), good results will be obtained in an injection molding machine, e.g., of the Newbury type with conventional cylinder temperatures, e.g., 450° F. and conventional mold temperatures, e.g., 150° F. On the other hand, with poly(ethylene terephthalate) because of the lack of uniformity of crystallization from interior to exterior of thick pieces, somewhat less conventional but still well known techniques can be used. For example, a nucleating agent such as graphite or a metal oxide, e.g., ZnO or MgO can be included and standard mold temperatures at at least 230° F. will be used.

DESCRIPTION OF THE PREFERRED EMBODIMENTS

The following examples illustrate the invention. They are set forth as a further description but are not to be construed as limiting the invention thereto.

EXAMPLES 1 and 2

Dry blends of poly(1,4-butylene terephthalate), intrinsic viscosity >1.1 dl./g., melt viscosity about 7051 poises, and varying quantities of potassium titanate single crystal filaments are compounded and extruded at 480° F. in a 1 inch Wayne extruder. For comparison purposes, blends of the polyester and varying quantities of ⅛ inch fibrous glass reinforcement are compounded and extruded. The extrudate is pelletized and injection molded in a Van Dorn machine at 500° F. (mold temp., 125° F.). For comparison purposes, unreinforced poly(1,4-butylene terephthalate) is also molded into test pieces. The formulations used and the physical properties (heat deflection temp., ASTM D-648; flexural, D-790; and Izod impact, D-256) obtained are summarized in Table 1:

Table 1.

Physical Properties of Compositions of
Poly(1,4-butylene terephthalate) and
Potassium Titanate Single Crystal Filaments

| Example | 1 | 2 | 1A* | 1B* |
|---|---|---|---|---|
| Ingredients (parts by weight) | | | | |
| poly(1,4-butylene terephthalate) | 98 | 95 | 100 | 95 |
| potassium titanate single crystal filaments ** | 2 | 5 | — | — |
| fibrous glass reinforcement ⅛" | — | — | — | 5 |
| Properties | | | | |
| Elongation at break, % | 200 | 40 | 400 | 20 |
| Gardner impact, in.-lbs. | 375 | 100 | 450 | 70 |
| Notched Izod impact, ft.-lbs./in. | 0.7 | 0.7 | 1.2 | 0.6 |
| Tensile strength, psi | 8000 | 8400 | 7800 | 9000 |
| Flexural modulus, psi | 368000 | 400000 | 340000 | 400000 |
| Heat deflection Temp., °F. | | | | |
| at 264 psi | 148 | 159 | 130 | 200 |
| at 66 psi | 320 | 335 | 310 | 392 |

* - Control.
** - DuPont FYBEX, potassium titanate, aspect ratio 40 to 1.

The above results demonstrate that potassium titanate single crystal filaments is a unique reinforcement when compared to glass fibers. At low levels of concentration, 2 and 5%, the polybutylene terephthalate is reinforced with potassium titanate, but still retains a surprising degree of toughness. On the other hand, the glass reinforced material has lost its practical toughness due to embrittlement.

EXAMPLES 3 and 4

The procedure of Example 1 is repeated, substituting a poly(1,4-butylene terephthalate) of lower molecular weight, intrinsic viscosity, 0.9 dl./g., melt viscosity, 2700 poises. The formulations and physical properties data are summarized in Table 2:

Table 2.

Physical Properties of Compositions of
Poly(1,4-butylene terephthalate) and
Potassium Titanate Single Crystal Filaments

| Example | 3 | 4 |
|---|---|---|
| Ingredients (parts by weight) | | |
| poly(1,4-butylene terephthalate) | 97.8 | 94.8 |
| potassium titanate single crystal filaments | 2.2 | 5.2 |
| Properties | | |
| Elongation at break, % | 33 | 23 |
| Gardner impact, in.-lbs. | <8 | <8 |
| Notched Izod impact, ft.-lbs./in. | 1.0 | 0.9 |
| Tensile strength, psi. | 8600 | 9000 |
| Flexural modulus, psi. | 381000 | 415000 |
| Heat deflection Temp., °F. | | |
| at 264 psi. | 140 | N.D.* |
| at 66 psi. | 340 | N.D. |

*N.D. - not determined.

The strength and stiffness of the lower molecular weight resin are more efficiently reinforced with potassium titanate, although toughness is somewhat adversely affected.

Obviously, other modifications are possible in view of the above examples. For instance, if the procedure of Example 1 is repeated, substituting for the poly(1,4-butylene terephthalate) the following high molecular weight linear polyesters:

a poly(ethylene terephthalate) having an intrinsic viscosity of about 0.9.

a 60/40 ethylene terephthalate-ethylene isophthalate copolyester having an intrinsic viscosity of about 0.9; or a poly(1,3-propylene terephthalate) prepared from trimethylene glycol and methyl terephthalate and having an intrinsic viscosity of about 1.0, reinforced polyester compositions according to this invention will be obtained.

Because of their excellent physical, mechanical, chemical, electrical and thermal properties, the resin-potassium titanate composites of this invention have many and varied uses. The molding powder formulations may be used alone or mixed with other polymers and may contain various fillers, such as wood flour, diatomaceous earth, carbon black, and the like, as well as flame retardants, non-dripping agents, pigments and dyes, stabilizers, plasticizers, and the like.

Obviously, other modifications and variations of the present invention are possible in the light of the above teachings. It is therefore to be understood that changes may be made in the particular embodiments of the invention described which are within the full intended scope of the invention as defined by the appended claims.

I claim:

1. A reinforced thermoplastic composition comprising:
   a. a high molecular weight poly(1,4-butylene terephthalate) resin, and
   b. potassium titanate, substantially in the form of single crystal filaments, in a minor proportion based on said composition, in an amount at least sufficient to reinforce the composition but in an amount not in excess of that which embrittles the composition.

2. A composition as defined in claim 1 wherein the ratio of length to diameter in said single crystal filaments is from about 10 to 1 to about 100 to 1.

3. A composition as defined in claim 2 wherein the ratio of length to diameter in said single crystal filaments is about 40 to 1.

4. A composition as defined in claim 1 wherein the potassium titanate comprises from about 1 to about 10% by weight of the combined weights of component (a) and component (b).

5. A composition as defined in claim 1 wherein the potassium titanate comprises from about 1 to about 5% by weight of the combined weights of component (a) and component (b).

6. A composition as defined in claim 1 wherein said poly(1,4-butylene terephthalate) has an intrinsic viscosity of at least about 0.8 deciliters per gram when measured in a solution in a 60:40 mixture of phenol and trichloroethane at 30° C.

7. A composition as defined in claim 6 wherein said poly(1,4-butylene terephthalate) has an intrinsic viscosity of at least about 1.1 deciliters per gram when measured in a solution in a 60:40 mixture of phenol and trichloroethane.

* * * * *